(12) United States Patent
Bernhardt et al.

(10) Patent No.: US 12,043,925 B2
(45) Date of Patent: Jul. 23, 2024

(54) METHOD OF RECOVERING FIBERS

(71) Applicant: Adler Pelzer Holding GMBH, Hagen (DE)

(72) Inventors: Siegfried Bernhardt, Bremen (DE); Volkmar Schulze, Schierling (DE)

(73) Assignee: ADLER PELZER HOLDING GMBH (DE)

(*) Notice: Subject to any disclaimer, the term of this patent is extended or adjusted under 35 U.S.C. 154(b) by 773 days.

(21) Appl. No.: 16/962,593

(22) PCT Filed: Jan. 14, 2019

(86) PCT No.: PCT/EP2019/050780
§ 371 (c)(1),
(2) Date: Jul. 16, 2020

(87) PCT Pub. No.: WO2019/141619
PCT Pub. Date: Jul. 25, 2019

(65) Prior Publication Data
US 2020/0407887 A1    Dec. 31, 2020

(30) Foreign Application Priority Data
Jan. 19, 2018    (DE) .......................... 102018101176.8

(51) Int. Cl.
*D01G 11/04*    (2006.01)
*D04H 13/00*    (2006.01)

(52) U.S. Cl.
CPC ............. *D01G 11/04* (2013.01); *D04H 13/00* (2013.01); *D10B 2505/12* (2013.01)

(58) Field of Classification Search
None
See application file for complete search history.

(56) References Cited

U.S. PATENT DOCUMENTS

| 9,676,917 B1* | 6/2017 | Tian ........................ B29B 17/02 |
| 2011/0244172 A1 | 10/2011 | Wright et al. |
| 2012/0037734 A1 | 2/2012 | Levy et al. |
| 2012/0149284 A1 | 6/2012 | Gillis et al. |
| 2012/0291601 A1 | 11/2012 | Mosley |
| 2013/0068865 A1 | 3/2013 | Levy et al. |
| 2013/0112727 A1 | 5/2013 | Bork et al. |
| 2013/0112790 A1 | 5/2013 | Rees et al. |

(Continued)

FOREIGN PATENT DOCUMENTS

| DE | 291218 C | 9/1914 |
| DE | 2003398 A1 | 5/1971 |

(Continued)

OTHER PUBLICATIONS

Machine translation of DE 7926843 (Year: 1980).*

(Continued)

*Primary Examiner* — Shawn Mckinnon
(74) *Attorney, Agent, or Firm* — Seth L. Hudson; Maynard Nexsen PC

(57) ABSTRACT

The invention relates to a method for recovering fibers from non-backed, backed and/or deformed carpet scraps and/or back-up material scraps of textile multi-layer composites, in particular of passenger compartment carpeting or luggage compartment carpeting in the field of automobile manufacture.

7 Claims, 4 Drawing Sheets

(56) References Cited

U.S. PATENT DOCUMENTS

| | | |
|---|---|---|
| 2013/0174517 A1 | 7/2013 | Kelley et al. |
| 2013/0231030 A1 | 9/2013 | Gillis et al. |
| 2013/0327858 A1 | 12/2013 | Rees et al. |
| 2013/0344281 A1 | 12/2013 | Wright et al. |
| 2014/0251545 A1 | 9/2014 | Burich et al. |
| 2015/0057379 A1 | 2/2015 | Bork et al. |
| 2015/0102138 A1 | 4/2015 | Rees et al. |
| 2015/0115075 A1 | 4/2015 | Levy et al. |
| 2015/0321383 A1 | 11/2015 | Rees et al. |
| 2015/0322231 A1 | 11/2015 | Wilson |
| 2016/0075848 A1 | 3/2016 | Hall et al. |
| 2016/0176006 A1 | 6/2016 | Gillis et al. |
| 2016/0368171 A1 | 12/2016 | Koo et al. |

FOREIGN PATENT DOCUMENTS

| | | | |
|---|---|---|---|
| DE | 7926843 | * | 2/1980 |
| DE | 7926843 U1 | | 2/1980 |
| DE | 2938169 A1 | | 4/1981 |
| DE | 19621916 A1 | | 1/1997 |
| DE | 4311708 C2 | | 3/1997 |
| DE | 10052262 A1 | | 4/2002 |
| DE | 10147676 C1 | | 12/2002 |
| EP | 0740001 A1 | | 10/1996 |
| EP | 1285997 B1 | | 6/2006 |
| EP | 1598476 B1 | | 7/2012 |
| EP | 3106237 A1 | | 12/2016 |
| EP | 3141366 A2 | | 3/2017 |
| JP | 07-68548 A | | 3/1995 |
| JP | 2001-123337 A | | 5/2001 |
| JP | 2001-159031 A | | 6/2001 |
| JP | 2006214053 A | | 8/2006 |
| JP | 2017-7324 A | | 1/2017 |
| JP | 2017007324 | * | 1/2017 |
| KR | 10-2016-0148877 A | | 12/2016 |
| RU | 2313626 C1 | | 12/2007 |
| WO | 2016/106024 A1 | | 6/2016 |
| WO | 2017/004494 A1 | | 1/2017 |

OTHER PUBLICATIONS

Machine translation of JP2017007324 (Year: 2017).*
International Search Report for International Application No. PCT/EP2019/050780 mailed on Mar. 26, 2019.

* cited by examiner

Floor carpeting insulation, segment

METHOD OF RECOVERING FIBERS

CROSS-REFERENCE TO RELATED APPLICATION(S)

The present patent/application is a National Stage Application of PCT/EP2019/050780, filed Jan. 14, 2019, and entitled "METHOD OF RECOVERING FIBERS," which claims priority to German Patent Application 10 2018 101 176.8 filed Jan. 19, 2018, and entitled "METHOD OF RECOVERING FIBERS."

FIELD OF THE DISCLOSURE

The Invention relates to a method for recovering fibers from non-backed, backed and/or deformed carpet scraps and/or back-up material scraps of textile multi-layer composites, in particular of passenger compartment carpeting or luggage compartment carpeting in the field of automobile manufacture.

BACKGROUND OF THE DISCLOSURE

The passenger compartment carpeting employed in the automobile industry mostly consist of the top layer (=utility layer), a carpet with different back-up materials; and the insulation. In particular, flat needle felts, velour and tufting are employed as said carpets.

For tufting carpets, Polyamide 6.6 (PA6.6), Polyamide 6 (PA6), Polypropylene (PP), recycled Polyamide (rPA) and recycled Polyethylene Terephthalate (rPET) are predominantly employed as yarn materials, and for velour and flat needle felt carpets, Polyethylene Terephthalate (PET), PET/PP, PP, Polyamide (PA)/PET and rPET are predominantly employed as fiber materials. The tufting backing in the tufting grades is mostly made of PET/PP, PET/Copolyester (coPET) or PET/PA. The fiber bonding materials employed here include, in particular: predominantly Ethyl Vinyl Acetate (EVA) and Polyethylene (PE) in tufting carpets, Styrene Butadiene Copolymer (SBR) latex or acrylate in the velour and flat needle felt carpets; further sheets, non-wovens, adhesives (hot melts), thermoplastic materials (mainly PE) and thermobonding in velour and flat needle felt carpets (Klieverik; EP 1 598 476 B1). Further, binding fibers, EVA or thermoplastic dispersions are Increasingly employed. The coating, mostly as an adhesive layer for substrate non-wovens, but also for stiffening, predominantly includes PE or PP.

The back-up materials (mainly acoustic and/or stiffening non-wovens) usually consist of PET and mixed-fiber non-wovens; PE/PA and PE/PA/PE sheets are employed as sealing or damping sheets, and PE/PA/PE+PET are employed as sheet non-wovens.

Depending on the acoustic requirements, so-called heavy sheets are also employed.

Between the top layer and the body floor, there is the insulation layer, especially of Polyurethane (PUR) foam or non-woven structures. The foam is firmly bonded to the top layer (foam-bonded); the non-woven structures may also be firmly bonded (usually adhesive-bonded) to the top layer; but mere stacking is also employed.

In the production of carpet fabrics, about 6% scrap Is obtained today, and up to 30% (contour trim) in the production of the floor carpets.

The scrap in the production of flat needle felts and velour (without bonding materials, without coating) is usually reprocessed; mostly shredded and recycled to fiber processing.

The scrap in the production of passenger compartment carpeting and luggage compartment carpeting is usually used for combustion (thermal recycling); also, it is employed, for example, for the production of floor coverings for equestrian fields (DE 101 47 676 C1, EP 1 285 997 B1).

Any reprocessing/further processing of the high quality fiber materials of carpet and back-up material scraps (contour trimming scrap) after backing and deformation into passenger compartment carpeting and luggage compartment carpeting in automobile manufacture does not take place.

The scrap in the production of flat needle felts and velour (without bonding materials, without coating; or only in minute amounts) as well as of acoustic/stiffening non-wovens [individual non-woven; unbacked and non deformed fabrics] is reprocessed.

Also, there are methods and devices by which individual layers or fibers of the carpet fabric are separated from the total composite, for example. There are methods and devices used for this purpose in the prior art, such as:

Shredding:
DE10052262A1, DE19621916A1, EP0740001A1.
Separating (also tufting carpet):
US 2013/0068865 A1, US 2015/0115075 A1, US 2013/0327858 A1, US 2015/0321383 A1, US 2015/0102138 A1, US 2013/0112790 A1, US 2016/0176006A1, US2016/0368171A1, WO2016/106024A1, US2012/0291601 A1, US 2013/0231030 A1, US 2012/0149284 A1, US 2012/0037734 A1, US 2014/0251545 A1, US 2015/0057379 A1 (by heating), US 2013/0112727 A1 (by heating), EP 3 141 366 A2 (by heating), US 2013/0174517 A1 (by means of a water bath).
Working with solvent:
US 2016/0075848 A1.
Methods for scrap recycling (carpet with bonding materials and coating; and optionally back-up materials) by extrusion methods are known:
DE43 11708 C2, US2015/0322231A1.
Further processing in coatings/compounds=> extrusion coating:
US 2011/0244172 A1, WO 2017/004494 A1, US 2013/0344281 A1.

DE 29 12 18 A1 describes a shredding machine with a corresponding method for disintegrating and regenerating fibrous starting materials and scraps without specifying the latter. The material to be separated to fibers is supplied by a charging device of a rotating shredding drum with shredding teeth, and processed with a downstream non-woven forming means consisting of a screen drum with reduced pressure applied to its interior space.

DE 41 21 024 A1 describes a method for reprocessing plastic-coated textile materials, in particular plastic-backed textile floor coverings, and for recovery of the textile fibers and plastics contained therein. The method includes the following operational steps:

cutting up the materials to be reprocessed into small shreds, roughly of the size 5×5 to 10×10 mm²; mixing the shreds with water to form a pumpable mass;
comminuting the shreds in a mill to form a pulp;
dewatering and drying the pulp;
mechanical separation of the fibers from the resulting plastic granules.

Furthermore, an installation for carrying out the method is described, which is characterized by the following components:

a shredding device composed of longitudinal cutters and cross cutters for the materials to be reprocessed;

at least one Intermediate store for the shreds with downstream metering and transport device;

at least one stirred vessel for the production of the shred suspension;

at least one mill for converting the shred suspension into a pulp;

at least one sieving apparatus having a drier arranged downstream;

at least one mechanical separation device for separating the fibers from the resulting plastic granules, wherein the components stirred vessel, mill and sieving apparatus are connected together by liquid pipes which can be shut off.

DE 2003 398 relates to a method and device for converting textile scrap into an industrially utilizable product, especially non-oriented or cold-oriented continuous threads of synthetic polymerization or polycondensation products.

On the one hand, the methods and devices set forth in the prior art for reprocessing carpet scraps are very complicated; and the ultimately produced "recyclates" are too expensive; on the other hand, the passenger compartment carpeting or luggage compartment carpeting scraps (contour trimmings) obtained especially in the automotive supply industry–carpet+substrate non-wovens+optionally sealing or damping sheets, backed and deformed–are not reprocessed. Thus, the fibers contained therein are not reutilized.

BRIEF SUMMARY OF THE DISCLOSURE

In one exemplary embodiment, the present disclosure provides a method for recovering fibers from at least one of non-backed carpet scraps, backed carpet scraps, deformed carpet scraps, and back-up material scraps of textile multi-layer composites. The method includes cutting the scraps to a desired size, in a cutting device, in lengthwise and crosswise directions. The method also includes shredding the cut scraps in a first shredding process with one or two roller feeds. The method further includes roughly separating the fibers from dust and powder fractions. The method yet further includes subjecting the separated fibers to dosage. The method still further includes subjecting the fibers to at least one continuous shredding process in a second shredding process. The method even further includes employing the fibers obtained from the second shredding process to prepare one of non-woven fabrics and sound insulation components in automobile manufacture.

In embodiments, the at least one of non-backed carpet scraps, backed carpet scraps deformed carpet scraps, and back-up material scraps of textile multi-layer composites are employed. Optionally, the separated fibers are treated in an air-conditioned chamber.

In embodiments, the method includes subjecting the separated fibers to interim storage after roughly separating the fibers from dust and powder fractions.

In some embodiments, the at least one of non-backed carpet scraps, backed carpet scraps, deformed carpet scraps, and back-up material scraps of textile multi-layer composites are from at least one of passenger compartment carpeting and luggage compartment carpeting in automobile manufacture.

In another exemplary embodiment the present disclosure provides a method for recovering fibers from at least one of non-backed carpet scraps, backed carpet scraps, deformed carpet scraps, and back-up material scraps of textile multi-layer composites in automobile manufacture. The method includes feeding the scraps to one of a two- and four-cylinder feed of a roller feed. The distance between the cylinders is adapted to the material employed. The method also includes continuously supplying the coarsely comminuted scraps, after dosing, to at least one first roller feed, The method further includes roughly separating, during comminution, the fibers from the dust and powder fractions. The method yet further includes continuously supplying the separated fibers, after dosing and optionally storage, to at least one further shredding process. The method still further includes employing the fibers obtained to prepare one of non-woven fabrics and sound insulation components in automobile manufacture.

In embodiments, the scraps fed to the one of the two- and four-cylinder feed of the roller feed are subjected to interim storage.

In embodiments, the at least one of non-backed carpet scraps, backed carpet scraps deformed carpet scraps, and back-up material scraps of textile multi-layer composites are employed.

In some embodiments, the separated fibers are one of wetted and vapor-treated. Optionally, the separated fibers are treated in an air-conditioned chamber.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

It is the object of the invention to provide a method for recovering fibers from non-backed, backed and deformed passenger compartment carpeting or luggage compartment carpeting scraps, especially from motor vehicles; and to reuse them predominantly in Industrial products, especially non-wovens (airlaid web, needle-punched web, Struto web) and insulations (pads, non-woven shaped parts, fiber flock components).

The method according to the invention is to enable the reutilization of fibers from carpet and back-up material scraps (contour trimming scrap) after backing and deformation to passenger compartment carpeting or luggage compartment carpeting in automobile manufacture, and the reuse thereof mainly in non-woven materials and sound-insulation components.

In a first embodiment of the invention, the above mentioned object is achieved by a method for recovering fibers from non-backed, backed and/or deformed carpet scraps and/or back-up material scraps of textile multi-layer composites, in particular of passenger compartment carpeting or luggage compartment carpeting in automobile manufacture, characterized in that 1. the scraps are cut to a desired size, especially at least 100×100 mm², by cutting in a cutting device in the lengthwise and crosswise directions;
2. the cut scraps are disintegrated in a first shredding process with one or two roller feeds;
3. the fibers are roughly separated from the dust and powder fractions;
4. the separated fibers are subjected to dosage and optionally storage;
5. the fibers are optionally wetted or vapor-treated, especially treated in an air-conditioned chamber;
6. the fibers are subjected to at least one second continuous shredding process; and
7. the fibers obtained are employed for preparing non-woven fabrics or sound insulation components in automobile manufacture.

With the method according to the invention, it is possible to reutilize the fibers from carpet and back-up material scraps (contour trimming scraps) after backing and deformation into passenger compartment carpeting and luggage compartment carpeting in automobile manufacture, and to reuse them mainly in non-woven materials and sound-Insulation components.

Figure 1:
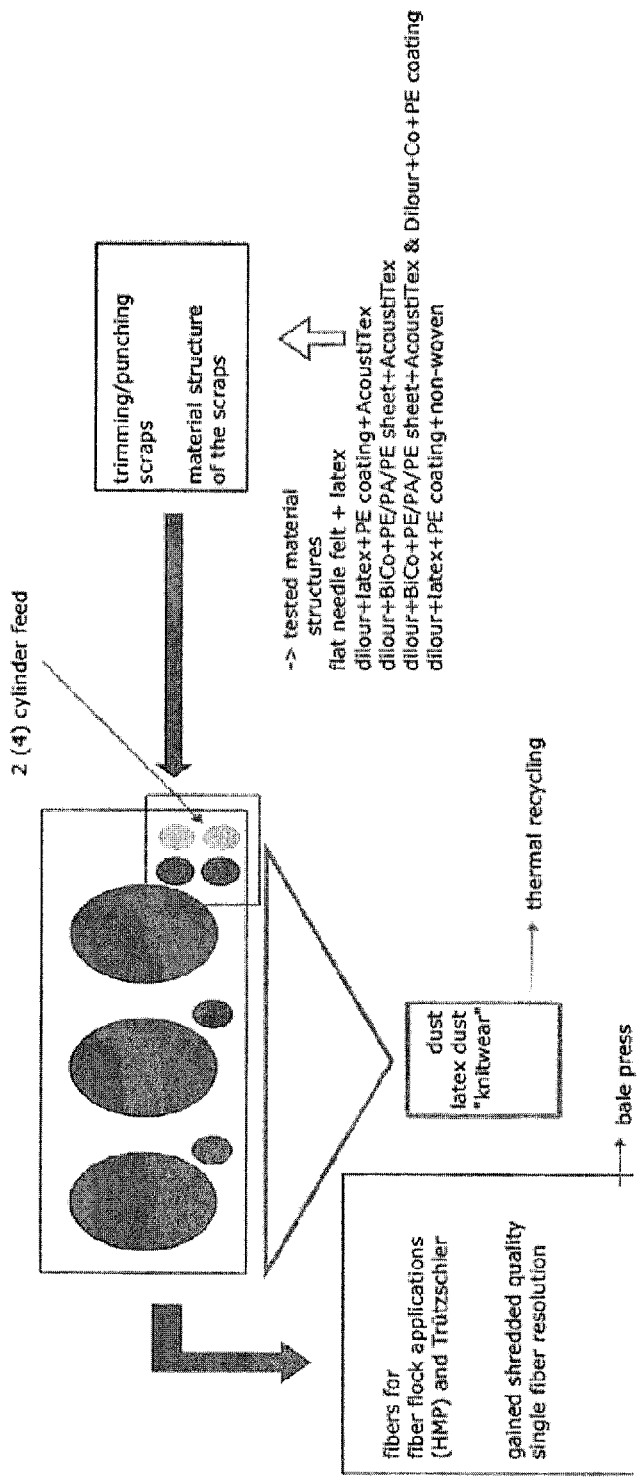
FIG. 1 shows the method according to the invention in the first embodiment.

FIG. 1 shows the method according to the invention in the first embodiment.

The trimming and punching scraps from the non-backed, backed and/or deformed carpet scraps and/or back-up material scraps of textile multi-layer composites, in particular of passenger compartment carpeting or luggage compartment carpeting in automobile manufacture, are laid onto a supporting table of the shredder in different sizes. There may be very large weight variations of the charge in terms of the thickness (mm) and the fiber orientation of the material (MD/CD).

When a roller feed is used here instead of a tray feed, the feed geometry to the shredding roller is larger. [For a roller diameter of 104 mm, for example, the free distance for the fiber composites is about 52 mm, clamping point to the shredding roller.] This creates more space for the materials irrespective of lengthwise or crosswise feeding, and the thickness.

Thus, a better material dosage, such as an amount of material subject to the 1st shredding roller, for the 1st shredding roller is obtained.

Metallic card clothing (fitting), which are preferably present on the feed rollers, also have the advantage of a corresponding holdback force. This prevents so-called "passers", i.e., long pieces, from being drawn in without control.

The feed rollers can be adjusted with respect to one another (gap distance) depending on the material, and varied in terms of distance to the 1st shredding roller. This can be done mechanically or through setting motors.

It is also important to mount a roller preferably in spring bearings (to the top) in order to compensate for non-uniformities of the charged material.

As with these systems of feeding, security measures can be effected with metal monitoring and mechanical overload control.

Preferably, the fibers are wetted or vapor-treated, or treated in an air-conditioned chamber, before the 2nd shredding.

In a concept with three shredding rollers without preliminary comminution of the charged material, the design according to FIG. 1 is to be preferably provided.

The advantage thereof will be the ability to better adjust the rollers 2 and 3. The distance of the tray to the shredding rollers 2 and 3 becomes closer. The quality is clearly improved thereby.

This is also associated with the fact that the proportion of materials that cannot be used below the feed (1st shredder) is not incorporated into the process (plastic, wood and the like).

Then, predominantly dust will be obtained below the roller feeds of shredders 2 and 3.

Figure 2:
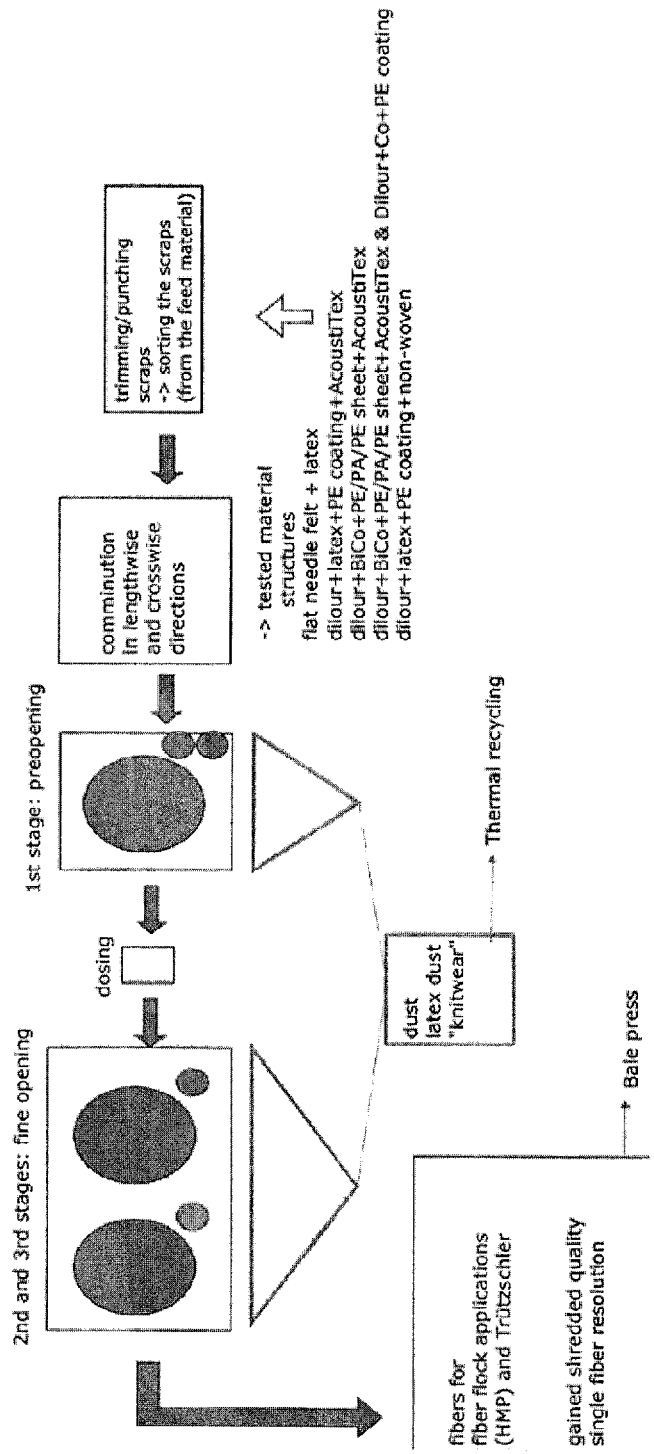
FIG. 2 shows the method according to the invention in another embodiment with preliminary comminution and preliminary opening.

In FIG. 2, the method according to the invention is described in another embodiment with preliminary comminution and preliminary opening.

The trimming and punching scraps obtained from the non-backed, backed and/or deformed carpet scraps and/or back-up material scraps of textile multi-layer composites, in particular of passenger compartment carpeting or luggage compartment carpeting in automobile manufacture, are charged depending on the quality of a cutting plant. The cutting process is performed in both lengthwise and crosswise directions. Thus, defined pieces with an optimized size are obtained, especially of at least 100×100 mm². The distances between the cutting knives may be either constant or variable.

Through a conveyor belt, the cut material is transported into an interim storage, which includes, for example, an upright spiked lattice and a shaft with adjustable width comprising discharge cylinders and an underlying belt.

From the conveyor belt, the material is conveyed to the roller feed of the 1st shredder. The 1st shredder takes the material, which has been better disintegrated by now, through a condenser into a dosing shaft with a subsequent belt weigher.

The belt weigher now adopts the function of quantity monitoring per unit time or quantity. This ensures that a defined quantity Is always available for the 2nd shredder. Here too, the fibers are preferably wetted or vapor-treated, or treated in an air-conditioned chamber, before the 2nd shredding.

A uniform production provides for a constant fiber opening and thus a constant quality.

Also, this system can then be better adapted to the different starting qualities.

With the separation of preliminary opening and fine opening, the mechanical settings can be better adapted. The drive and the power consumption can be chosen smaller. The fitting of the roller pins can be optimized accordingly, i.e., the "pre-shredding quality" can be selectively influenced in accordance with the structure of the material to be opened.

Also, the design of this concept as a continuous system, i.e., a continuous fiber passage through the plant, is possible.

In this case too, the belt weigher controls the whole system. A precondition for this is to design the feeds and, in an ideal case, also the shredding rollers 2 and 3 to be controllable in terms of drive. Then, the length of the shredded fibers can be influenced selectively.

Thus, the essential core of the present invention resides on the one hand in the provision of a method for separating a compressed, bonded and in part coated fiber material from textile material composites (passenger compartment carpeting and luggage compartment carpeting) and on the other hand in the reprocessing/further processing of the high quality fiber materials, for example, into non-wovens (airlaid web, needle-punched web, Struto web) and insulations (pads, non-woven shaped parts, fiber flock components).

The advantages reside, in particular, in the saving of new raw materials/materials, the energy saving, and a lower load on the environment.

In addition, the cost is clearly reduced as compared to the prior art, both in terms of components and personnel.

If the thermal recycling (combustion) is also taken into account, an almost complete utilization of scraps is possible.

Figure 3:
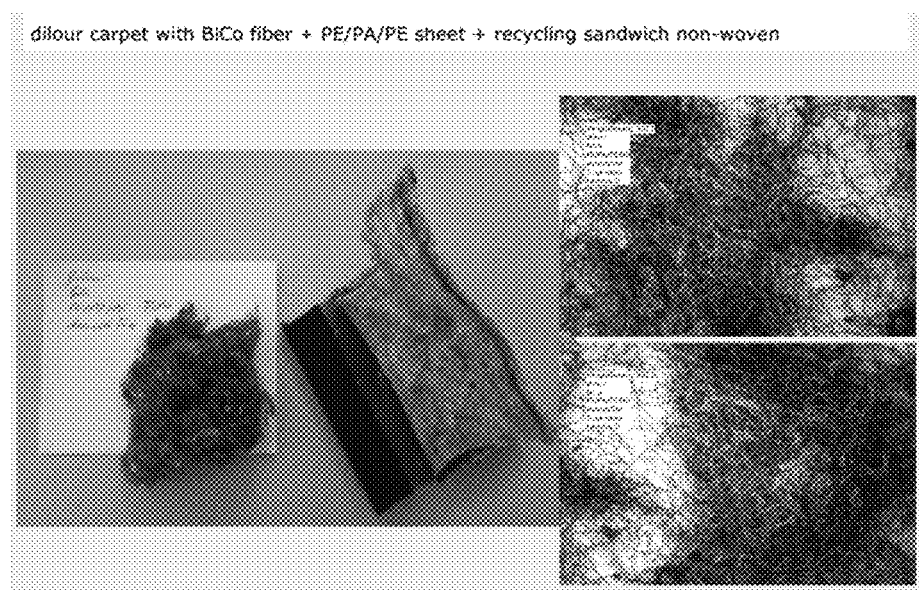
FIG. 3 illustrates the material structure of the contour trimming scraps in the production of passenger compartment carpeting after the deformation of the multi-layer composite and its punching cut.

The contour trimming scraps in the production of passenger compartment carpeting after the deformation of the multi-layer composite and its punching cut consists, for example, of the following material structure, which is shown in FIG. 3:

560 g/m$^2$ PET carpet, bonded with 20% BiCo (bicomponent) fiber, a PE/PA/PE sheet (100 μm) and a recycling sandwich substrate non-woven (900 g/m$^2$, PET/PP/BiCo).

The shredding was performed by applying the method according to the invention according to FIG. 2 with preliminary comminution and preliminary opening.

Because of the comminution of the charged scraps, a good setting for the process could be found after the 1st shredder.

The materials leaving the dosing shaft could be fed through the belt weigher into the shredders 2 and 3 in a defined way.

The belt weigher controlled the production.

When the weight on the belt weigher deviates + or − (within limits of 50%, for example), the feed is accordingly regulated up or down.

The feedback control system was designed so that the upstream systems also adapted to the speeds.

Figure 4:
FIG. 4 illustrates a segment of a floor carpet insulation with separate fibers reused in the production thereof.

The thus separated fibers (see FIG. 3) were reused in the production of a floor carpet insulation in a fiber flocking method. A segment of this insulation can be seen in FIG. 4.

The insulation was examined according to the specifications of the automobile industry; including TVOC, formaldehyde, acetaldehyde, smell, fogging, mechanical and thermal requirements.

All requirements were met!

Another test was performed with the following material structure: 560 g/m$^2$ PET carpet, 120 g/m$^2$ latex, 120 g/m$^2$ PE coating and a recycling sandwich substrate non-woven (900 g/m$^2$, PET/PP/BiCo).

It was clearly noted that the latex was also separated from the fibers by the method according to the invention. It flowed out in the form of particles.

Figure 5:
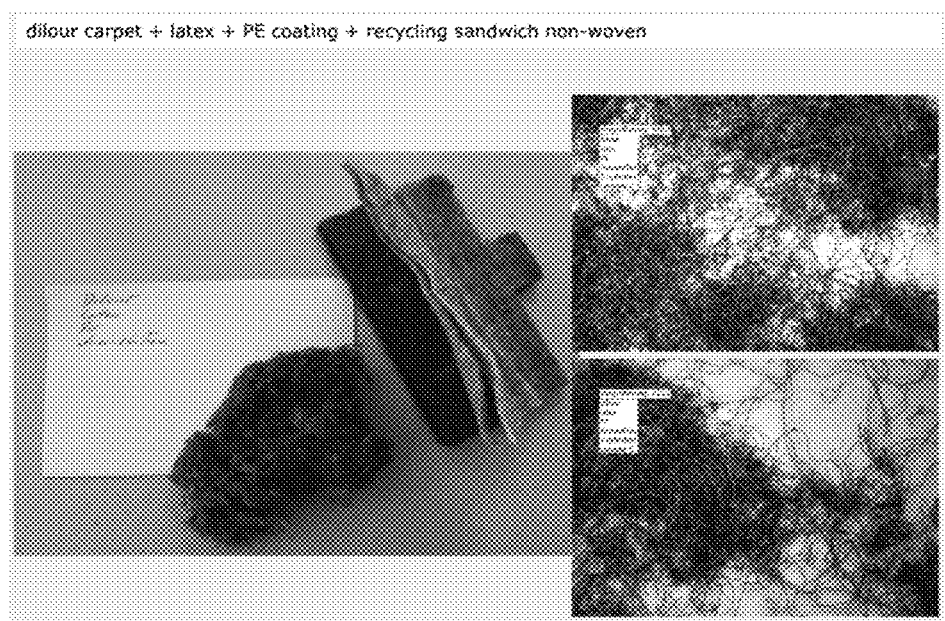
FIG. 5 Illustrates separate fibers reused in the production of a passenger compartment carpeting insulation in a fiber flocking method.

Here too, the fibers (FIG. 5) were reused in the production of a passenger compartment carpeting insulation in a fiber flocking method.

All tests met the specifications of the automobile industry. It is to be pointed out that the emission values were observed despite the latex bonding of the carpet.

The invention claimed is:

1. A method for recovering fibers from at least one of non-backed carpet scraps, backed carpet scraps, deformed carpet scraps, and back-up material scraps of textile multi-layer composites, the method comprising:
    cutting the scraps to a desired size, in a cutting device, in lengthwise and crosswise directions;
    transporting the cut scraps by a conveyor belt into interim storage, wherein the interim storage has an upright spiked lattice and a shaft with adjustable width comprising discharge cylinders, and the cut scraps are conveyed from the conveyor belt for shredding the cut scraps in a first shredding process with a roller feed of a first shredder;
    roughly separating the fibers from dust and powder fractions;
    subjecting the separated fibers to dosage, wherein the first shredder transports the material through a condenser and into a dosing shaft with a belt weigher;
    subjecting the separated fibers to at least one continuous shredding process in a second shredding process; and
    employing the separated fibers obtained from the second shredding process to prepare one of non-woven fabrics and sound insulation components in automobile manufacture, wherein the separated fibers are wetted or vapor-treated and treated in an air-conditioned chamber.

2. A method for recovering fibers from at least one of non-backed carpet scraps, backed carpet scraps, deformed carpet scraps, and back-up material scraps of textile multi-layer composites in automobile manufacture, the method comprising:
    transporting the scraps by a conveyor belt into interim storage, wherein the interim storage has an upright spiked lattice and a shaft with adjustable width comprising discharge cylinders;
    feeding the scraps to one of a two- and four-cylinder feed of a roller feed, wherein the distance between the discharge cylinders is adapted to the material employed, and the scraps are conveyed from the conveyor belt for shredding the scraps in a first shredding process with a roller feed of a first shredder;
    subjecting the separated fibers to dosage, wherein the first shredder transports the material through a condenser and into a dosing shaft with a belt weigher;
    continuously supplying the scraps, after dosing, to at least one first roller feed;
    roughly separating, during comminution, the fibers from the dust and powder fractions;
    continuously supplying the separated fibers, after dosing and optionally storage, to at least one further shredding process; and
    employing the separated fibers obtained to prepare one of non-woven fabrics and sound insulation components in automobile manufacture, wherein the fibers are wetted or vapor-treated and treated in an air-conditioned chamber.

3. The method according to claim 1, wherein the at least one of non-backed carpet scraps, backed carpet scraps deformed carpet scraps, and back-up material scraps of textile multi-layer composites are employed.

4. The method according to claim 1, further comprising subjecting the separated fibers to interim storage after roughly separating the fibers from dust and powder fractions.

5. The method according to claim 1, wherein the at least one of non-backed carpet scraps, backed carpet scraps, deformed carpet scraps, and back-up material scraps of textile multi-layer composites are from at least one of passenger compartment carpeting and luggage compartment carpeting in automobile manufacture.

6. The method according to claim 2, wherein the scraps fed to the one of the two- and four-cylinder feed of the roller feed are subjected to interim storage.

7. The method according to claim 2, wherein the at least one of non-backed carpet scraps, backed carpet scraps deformed carpet scraps, and back-up material scraps of textile multi-layer composites are employed.

* * * * *